May 15, 1923.
E. L. BARNES
1,455,757
LIQUID MEASURING STRUCTURE
Filed Dec. 31, 1919     4 Sheets-Sheet 1
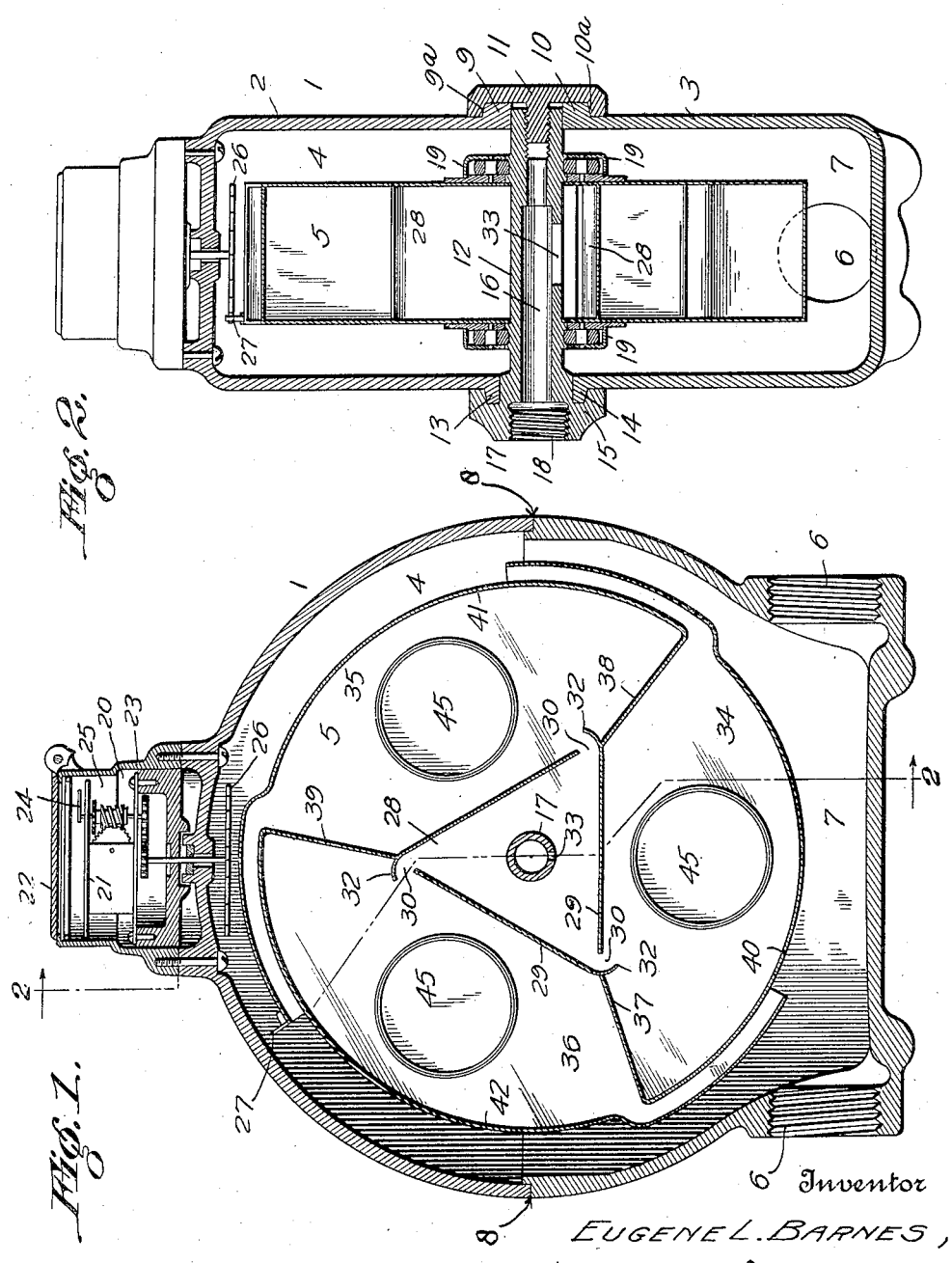
Inventor
EUGENE L. BARNES,
By *Edmund H. Parry*
Attorney May 15, 1923. 1,455,757
E. L. BARNES
LIQUID MEASURING STRUCTURE
Filed Dec. 31, 1919  4 Sheets-Sheet 2
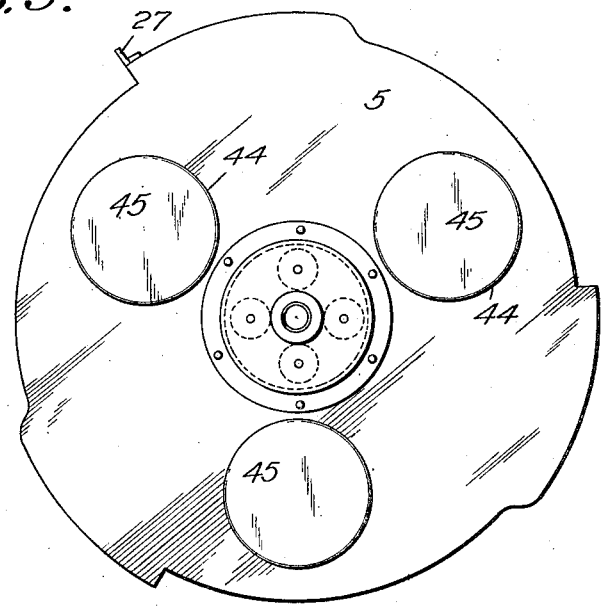
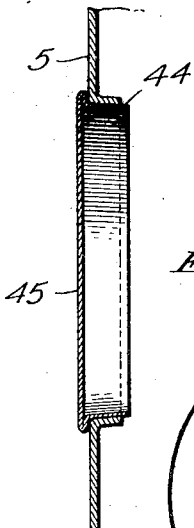
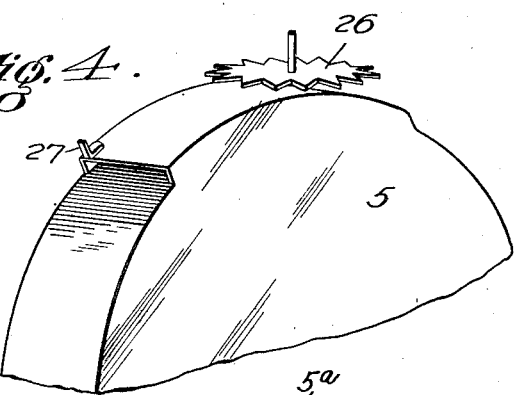
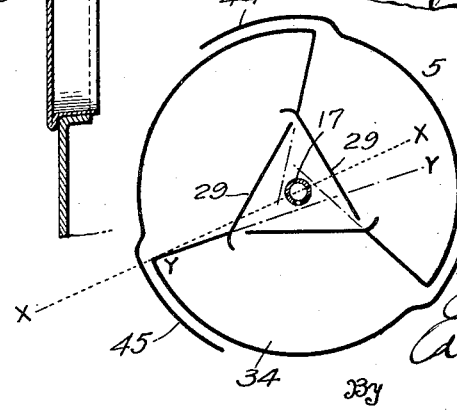
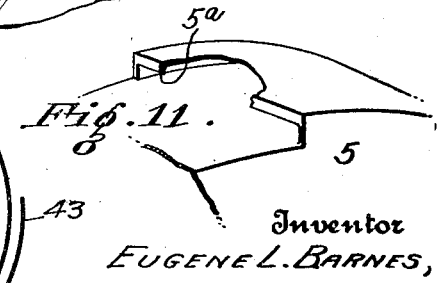
Inventor
EUGENE L. BARNES, May 15, 1923.
E. L. BARNES
LIQUID MEASURING STRUCTURE
Filed Dec. 31, 1919 4 Sheets-Sheet 3
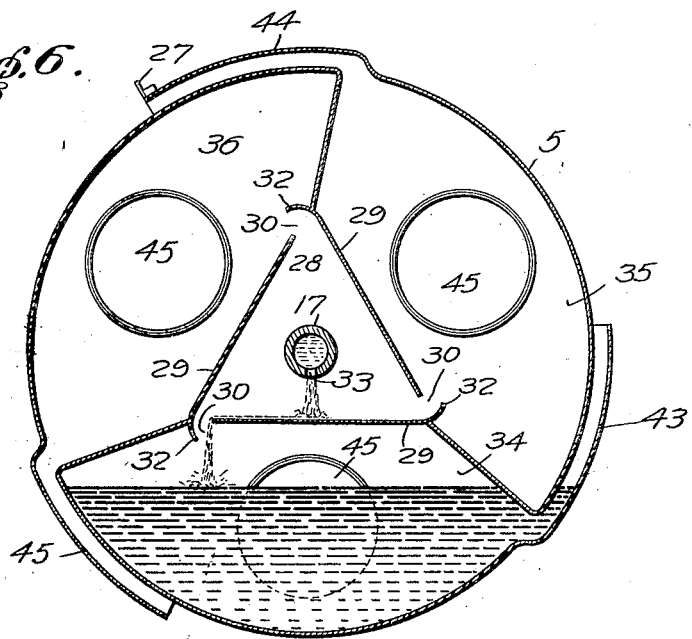
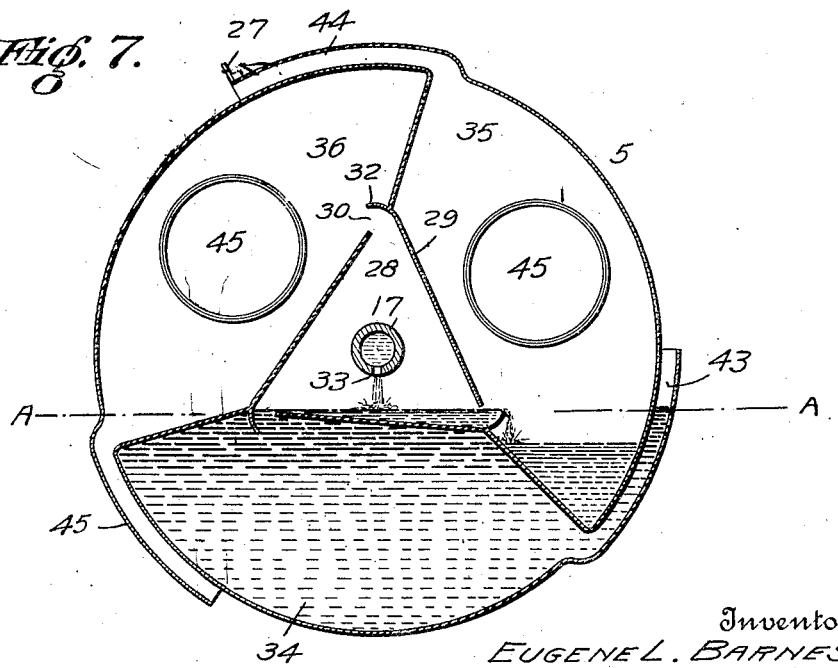
Inventor
EUGENE L. BARNES,
By Edmund H. Parry
Attorney May 15, 1923.
E. L. BARNES
LIQUID MEASURING STRUCTURE
Filed Dec. 31, 1919
1,455,757
4 Sheets-Sheet 4
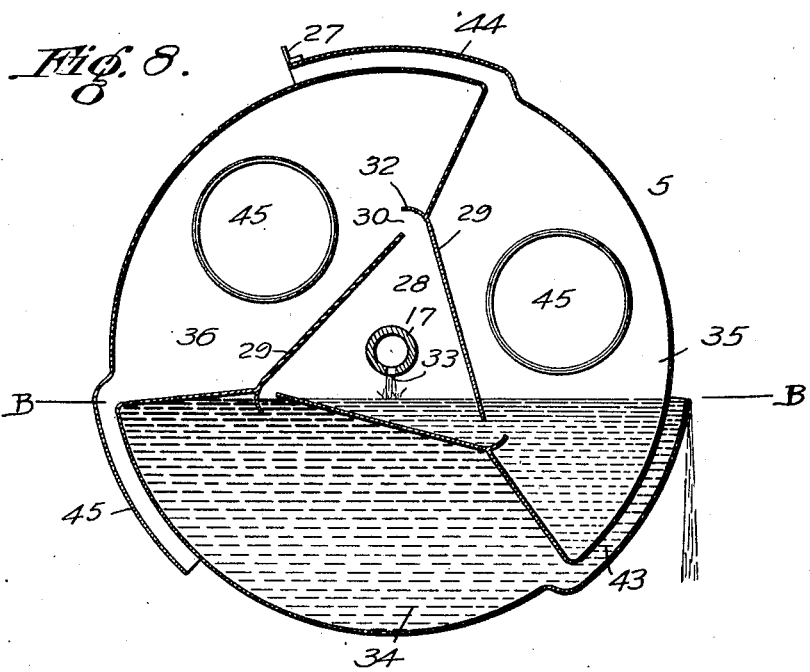
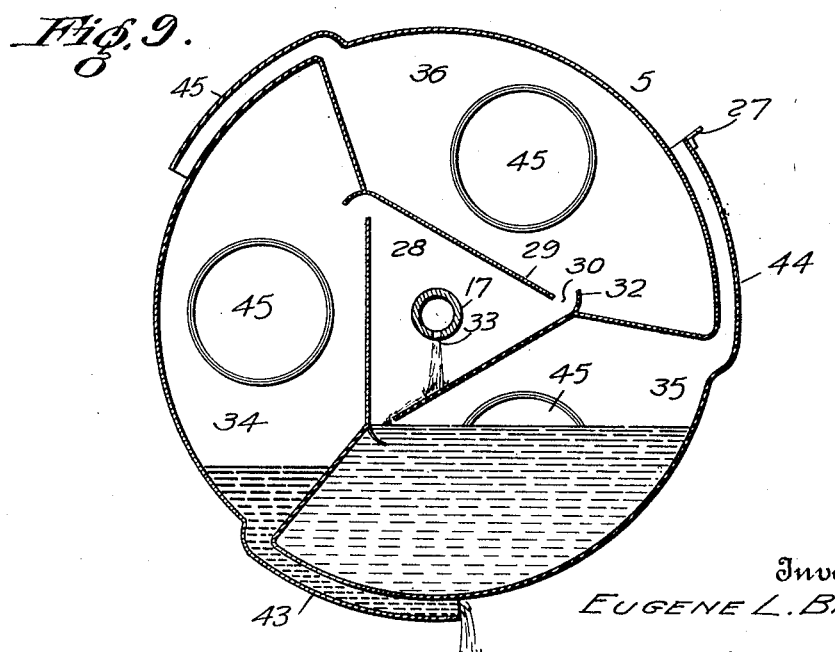
Inventor
EUGENE L. BARNES
By Edmund H. Parry
Attorney Patented May 15, 1923.

1,455,757

UNITED STATES PATENT OFFICE.

EUGENE L. BARNES, OF BUFFALO, NEW YORK, ASSIGNOR TO AMERICAN DISTRICT STEAM COMPANY, OF NORTH TONAWANDA, NEW YORK, A CORPORATION OF NEW YORK.

LIQUID-MEASURING STRUCTURE.

Application filed December 31, 1919. Serial No. 348,607.

*To all whom it may concern:*

Be it known that I, EUGENE L. BARNES, a citizen of the United States, residing at Buffalo, in the county of Erie and State of New York, have invented certain new and useful Improvements in Liquid-Measuring Structures, of which the following is a specification, reference being had therein to the accompanying drawing.

This invention relates primarily to liquid measuring structures and has more particular reference to devices for metering water of condensation and other similar fluids.

The primary object of the invention is to privide a liquid measuring and metering structure which is certain in its operation, accurate in the results which it produces, and practically free from disturbance by reason of extraneous conditions whereby its operation would be seriously affected.

Another object of the invention is to provide, in such a structure, means whereby the metering operation is effected in a practically continuous manner and in accordance with the flow of the liquid being measured.

A still further object within the contemplation of the invention is to provide for ready access to the internal parts of the structure by an operator and yet be so constructed that it may not be tampered with by a user; and, to this end, the structure includes a casing of separable sections with means for securely fastening them together.

Still another object of the invention, and one of considerable importance, is to provide means for cleaning the fluid-operated drum forming a component of the structure.

With these and other objects in view, the invention resides in a novel construction, in a unique aggroupment of its components, and in certain details thereof, all as hereinafter set forth.

In the particular situation in which my improved metering structure is to be utilized, it is of prime importance that the amount of fluid which flows through the structure shall be metered with the highest degree of exactness: In other words, where my measuring device is employed for metering water of condensation resulting from steam supplied to a user from a central plant, there should be no factor of uncertainty in the quantity of the fluid developed inasmuch as the user is charged, for the steam supplied, on the basis of the amount of the water of condensation which results from the used steam. It has now come to be a very general practice to generate steam at a central plant and, then, to supply it to various users in a community, to buildings, apartment houses, residences, etc., and in connection therewith, various types of measuring instrumentalities have been developed and used; but, by reason of more or less unsatisfactory results incident thereto, the present invention was developed and this, in practice, has been found to be not only satisfactory but, from every point of view, successful, in that it includes relatively few parts, is exact and certain in the results produced, and is readily installed and, thereafter, inspected and maintained in workable condition.

In order that the invention may be more readily comprehended, I have disclosed the same in the accompanying drawings; but it is to be understood that these are, for the most part, merely illustrative and constitute a preferred and practical embodiment of the invention; and, in thus showing one embodiment, it is to be recognized that my inventive concept is susceptible of other embodiments and utilizations, with a wide range of modification and variation, without departing from the spirit of the invention or sacrificing any of its salient or underlying principles.

In these drawings:

Fig. 1 is a view in central vertical section of a liquid-measuring structure made in accordance with my invention;

Fig. 2 is a view partly in vertical transverse section, on the line 2—2, Fig. 1, of the same.

Fig. 3 is a detached view, in elevation, of the liquid-operated drum or rotor;

Fig. 4 is a fragmentary view, in perspective, of a portion of the drum or rotor which carries a trip for operating an associated star wheel forming a component of the register;

Fig. 5 is a fragmentary view, in section, of one of the closure devices disposed in one wall of the drum;

Figs. 6, 7, 8 and 9 are views of the liquid-operated drum, detached, showing the same in its successive positions as actuated by the inflowing of the liquid and the discharge of such liquid from the central compartment into each of the liquid-receiving compartments and also illustrating how the lips or baffles at the discharging portions of the rotor insure the filling of one of the receiving-compartments before filling of another compartment is initiated;

Fig. 10 is a fragmentary view of the drum, showing, by indicating lines, the direction in which the end walls of the outer compartments extend in relation to the axis of the drum; and Fig. 11 is a view in sectional perspective of the drum, showing a modified form of liquid-discharging channel.

In these several views, the reference-numeral 1 designates, generally, a casing comprising, preferably and as shown, an upper component 2 and a lower component 3; these two components being combined to form an internal chamber 4 in which a rotatable drum or rotor 5 is housed.

The lower component 3 is provided with discharge-ports or openings 6, formed preferably in its lower portion and opening into a liquid-receiving chamber 7, this chamber being adapted to have delivered to it, during the rotation of the drum, the liquid-contents of the drum which actuate the latter.

The upper and lower components 2 and 3 of the casing are, preferably and as shown, locked together in a manner that eliminates the employment of bolts along a flanged edge or periphery: To this end, the joint 8 between the upper and lower components is, preferably and as shown, L-shaped. Moreover, each component, contiguous to the joint 8 and at one side thereof, is formed with a half-section 9 and 10, respectively, of a boss. These boss-sections are provided with a tapered surface 9ª and 10ª, respectively, adapted to be embraced by a tapered nut-and-bolt element 11, this bolt being threaded into one end of a shaft 12 upon which the drum 5 is mounted and which constitutes the axis of its rotative movement. The boss-sections 9 and 10 form a journal for one end of the shaft 12. The opposite end of this shaft is similarly journaled in tapered boss-sections 13 and 14 formed on the opposite side of the upper and lower casing-components. The shaft 12 is formed with an enlarged head 15 adapted to embrace the boss-sections 13 and 14. By reason of the fact that the surfaces of the boss-sections 9, 10, 13 and 14 are tapered, and similarly the engaging portions of the bolt 11 and the head 15, the screwing of the bolt 11 into the shaft 12 has a tendency to draw these two elements together with a consequent tendency to tighten the L-shaped joint 8 between the upper and lower halves of the casing. By this means, the casing halves or components are securely held together and, in a sense, are locked against being tampered with by a user; this locking means being, however, actuatable by a properly constituted wrench or other tool in the hands of an inspector, so as to afford the separation of the two casing halves and access, thus, to the interior of the casing.

The shaft 12 is, preferably and as shown, privided with a bore 16, centrally formed, and constitutes an intake-nozzle which I will designate 17, the head 15 being internally threaded to provide a proper connection with a pipe leading to a service main or other source of supply (not shown).

It will now be perceived that the nozzle 17 not only constitutes a means for introducing liquid from a source of supply into the casing but, also, constitutes the axis of rotation of the drum or rotor 5. In order to facilitate the rotative movement of the drum on the nozzle, bearings 19 are interposed between the drum 5 and the shaft 12.

The rotor or drum 5 is adapted to be rotated in a practically continuous manner as the liquid flows through the nozzle into the drum; and, by such rotative movement, is adapted to actuate a register, marked 20, disposed in this instance in the upper part of the casing component 2. Inasmuch as this register, in its details, and its particular location on the casing constitute no part of the present invention, I deem it unnecessary to describe it in detail beyond saying that it includes a dial 21 underlying a lid or cover 22 hinged to the upper section of a register-housing 23 secured in the casing component 2, as shown. A pointer 24 is associated with the dial 21 and receives its motion through a train of worm and gear elements marked, generally, 25, which, in turn, are actuated by a star-wheel 26 depending from the register housing 23 and occupying a position above the drum 5, but in a position to be actuated, from time to time, by a trip 27 projecting beyond the peripheral-outline of the drum 5: As the drum 5 completes a revolution the trip 27 is brought into operating engagement with the star-wheel 26 and effects a partial rotation thereof and, thereby, the pointer 24 is moved one increment over the dial, the latter being provided with suitable metering dimensions, as well understood.

The flow of liquid through the nozzle 16 into the drum 5 may, under some conditions, be continuous, while, under other conditions, it is intermittent; but, however this may be, the operation of the register is rendered certain and accurate and the results thereon shown would be a true indication of the exact quantity of fluid passing through this meter.

In order to secure the required certainty and accuracy of operation and results, just mentioned, it is a desideratum of my inventive concept that the drum 5 shall be so constituted that it will be affected for its actuation, by the inflowing liquid to the utmost measurable extent. To this end, the drum 5 is formed with a series of liquid-receiving and discharging compartments or chambers of a particular form and size.

Surrounding the nozzle 17 is a central compartment 28, essentially of polyangular form so as to provide walls 29 necessarily arranged angularly to each other.

The central triangular compartment 28 is provided with discharging ports or openings 30. Contiguous to these ports and preferably formed as an extension of the walls 29 are liquid-guiding lips or baffles 32 which, preferably and as shown, are curved so as to provide a liquid-guiding surface which is approximately concentric with the axis of the drum. The walls of this compartment form, in cross-section, an approximately equilateral triangle, the axis of the drum being the mathematical central axis of the triangle, and the discharge ports being disposed in proximity to each apex.

As a means of communication between the bore 16 of the nozzle 17 and the triangular compartment 28, the shaft 12 is provided with a port or opening 33, and this provides for the introduction of liquid, passing through the nozzle, into the triangular compartment.

Concentrically arranged about the triangular compartment, and interconnected therewith, are a series—in this instance there being three—of liquid-receiving compartments 34, 35 and 36, respectively. These outer liquid-receiving compartments are formed, in part, by the angular walls 29 of the polyangular compartment 28 and, also, by two angular walls 37, 38 and 39, respectively. Each two of these angular walls (37—38, 38—39, and 39—37) form the end walls of the respective compartments. These compartments are also formed of an arch-shaped peripheral wall 40, 41 and 42, respectively. Thus, it will be seen that the outer compartment 34 comprises the angular wall 29 of the polyangular compartment 28, the two angularly-disposed end walls 37—38, and the peripheral wall 40, and the other compartments are similarly constituted. Preferably and as shown, the angular end walls (37—38, 38—39, and 39—37) of the outer compartment extend on lines which are angularly disposed to a line that would intersect the axis of rotation of the drum, and are, thus, somewhat angularly disposed in relation to the walls of the central compartment 28. The lips 32 are disposed between the end walls of the outer compartments and the walls of the central compartment 28, they extend into the outer compartments, as shown, and they project in a direction practically at right angles to the end walls of the compartments.

The several outer liquid-receiving compartments are provided with elongated liquid-discharging channels 43, 44 and 45, these being peripherally disposed along the outer curved walls of the adjacent compartment, and are of predetermined dimensions, as to length and depth, so as to permit a definable quantity of liquid to accumulate therein preliminary to being discharged therefrom as the drum rotates.

Inasmuch as the action of the drum may, under some conditions—as by the internal pressure of the fluid pssing therethrough—be somewhat affected, I may provide each of these liquid-discharging channels with a baffle or dam 5$^a$, as shown in Fig. 11, the function of which is to dam and retard the outflowing liquid and prevent it from effecting a sort of reaction on the liquid then in the chamber 7 and, also, to effect a retarding action on the rotor and thereby prevent undue spinning thereof.

Operation: The operation of the structure, described in the foregoing, will be more or less self-evident: Assuming that it is entirely empty and that the compartment 34 occupies a filling position, namely, that shown in Fig. 1, the fluid—such as water of condensation—will pass from the nozzle through the port 33 therein and into the central tank or compartment 28. From there, it flows toward the left (as shown in Fig. 6), through the left-hand port 30 and into the compartment 34. When this latter compartment is completely filled, and no more of the fluid can pass from the compartment 28 into the compartment 34, it will then begin to overflow the lip 32 at the right and into the compartment 35. Inasmuch as the drum will rotate in accordance with the accumulation of weight of the fluid in the measuring compartment 28, the drum at all times, as the weight of the fluid effects an overbalancing action of the drum, is given a rotative movement; but this will not occur until the first filling-compartment 34 has been filled to its capacity, whereupon the fluid will rise against the bottom of the triangular compartment to a height where it will overflow the lip or dam 32 at the entrance of the next succeeding compartment, whereupon the accumulated weight of the fluid will cause the drum to rotate and, in its rotation, the opening of the preceding compartment will rise beyond the level of the water in the central compartment, thus accurately measuring the fluid in the preceding compartment before it is allowed to discharge through the channel 43 into the chamber 7. The fluid in this preceding compartment will discharge in proportion to the accumulating fluid in the preceding compartment; but, at no time from the moment it commences to discharge can any additional fluid enter this compartment because the opening from the central compartment will then be much higher than the opening or port leading into the preceding compartment; and so on throughout the complete rotation of the drum. As a result of experimentation, it has been determined that the exact angle at which the walls of the central compartment should be set, with reference to the discharge-opening of the various compartments, is of prime importance, in that the lowermost wall 29 of the central compartment must, during the normal filling of the underlying compartment, first occupy an approximately horizontal position and gradually move from that position as the water fills the underlying compartment and overflows into the central compartment and from that compartment into the next succeeding compartment, the gradual filling of which effects a rotative movement of the drum and flow of the water into the channel 43. This, then, is, itself, filled with the fluid and permits an overflowing of the same into the chamber 7. As illustrated, more or less diagrammatically, in Figs. 6, 7, 8 and 9, the emptying of the first compartment—say, compartment 34—will begin before the next succeeding compartment (35, for instance) is quite half full of the fluid. Eventually, compartment 35 reaches the position that had been occupied by compartment 34, the latter all the time discharging its contents into the chamber 7. As compartment 34 empties its contents and compartment 35 is being filled, compartment 36 is being brought into the position first occupied by compartment 35 and eventually will reach a filling position, the same as compartment 35 had. And so on, successively, the different compartments are filled and emptied; and this filling and emptying operation continues the rotation of the drum so as to bring the trip 27 into engagement with the star-wheel 26 to operate the register.

A feature of importance in this construction is to admit the fluid into a compartment at a point not too remote from the periphery of the drum, and thereby effect a quick and positive cut-off of the fluid when the drum rotates and the fluid rises above the water level in the central compartment and begins to overflow into the next succeeding compartment. In this connection, the angular arrangement of the walls of the central compartment, as may readily be perceived, contributes to an important degree in first discharging its contents into the underlying compartment, (then being filled,) and, then, when that compartment is filled, and in predetermined relation to the rotation of the drum, the fluid rises above the lowermost angular wall of the central compartment, the tendency of the fluid therein to flow into the next succeeding compartment being at first retarded by the baffle or dam 32. As the fluid reaches a level indicated by the line A—A (Fig. 7), the discharge of the fluid from the compartment 28 into the compartment 34 will cease and the fluid will then begin to flow into the compartment 35; thereupon, as the drum rotates, the fluid will reach a level in compartments 28, 34 and 35 indicated by line B—B (Fig. 8) and it is then that the fluid begins to discharge from the channel 43; and so on for each successive compartment.

As indicated in Fig. 10, the lines along walls 37, 38 and 39 of the outer compartments bear an angular relation to a line extending through the axis of the drum; and this arrangement is important in controlling the instant of cutitng-off of the flow of the fluid from the central compartment 28 into one compartment, and its overflow from the central compartment into the next succeeding compartment; and, then again, this angular relation of the walls also contributes to the effective discharge of all of the fluid from the compartment, as illustrated, for instance, by the position of the fluid in compartment 34, Fig. 9.

I am aware that it has heretofore been proposed to provide a measuring drum or bucket comprising a central compartment and a series of outer or filling compartments; but in all of those instances with which I am familiar, the central compartment is cylindrical and the end walls of the outer compartments extend upon radial lines which intersect the axis of the drum. In such an arrangement, the outflow of fluid first from the central compartment into each successive outer compartment, and, then, from these outer compartments into the receiving chamber 7 cannot, as I have determined by experiments, be as effectually, rapidly, and completely accomplished as in the arrangement herein disclosed. I believe myself to be the first to provide a central compartment of triangular form, provided with a plurality of ports at the corners of the central compartment, such that, just as the fluid begins to discharge from the central compartment into the next succeeding compartment, its flow into the preceding compartment is instantly cut off, whereby only a predetermined quantity of water can enter each filling compartment from the central compartment, with a consequent exactness in the operative rotation of the drum to show its result with preciseness on the register associated with the drum.

By reason of the accumulation of sediment, etc., in the compartments, it is important that provision shall be made for affording access thereto in order that the compartments may be cleaned from time to time: To this end, I have provided each of the outer compartments with an aperture 44, and each of these apertures is normally provided with a closure-device 45, capable of readily being removed when desired. When occasion requires that sediment and other foreign matter that has deposited on the inside of the drum shall be removed, the separable halves 2 and 3 of the casing are unlocked and disconnected, whereupon one or another, or all, of the closure devices 45 may be removed, and then access to each of the outer compartments may be had.

From the foregoing, it will be perceived that I have provided a simple, but none the less effective, structure for measuring and metering various kinds of fluids, such as water of condensation resulting from the use of the same as supplied from a central plant; furthermore, that this structure is one which may readily be manufactured; and that, withal, precise results, as to the amount of steam consumed by a user, as determined by the amount of water of condensation which results therefrom, can be ascertained at all times.

What I claim is:

1. A structure for metering water of condensation and the like, including a fluid-operated rotor-device comprising a central liquid distributing compartment having a plurality of walls angularly arranged in relation to each other and arranged to be overbalanced and rotated by accumulating liquid, said compartment having a series of discharge openings adjacent the extremities of the walls; a series of liquid-receiving compartments disposed about the central compartment, of odd number, and each having one of its walls formed by the angular wall of the central compartment and having, also, an outside wall and angular inside walls; a baffle formed on each of the angular walls of the central compartment and extending into the adjacent compartment to provide a liquid-receiver; means forming liquid-discharging channels extending out of the receiving-compartments; and a liquid-inlet extending into the central compartment.

2. A structure for metering water of condensation and the like including, as components, a fluid-operated rotor-device comprising walls arranged to constitute a central liquid-distributing compartment, poly-angular in form and provided with a series of discharge-openings adjacent its corners; a series of liquid-receiving compartments disposed about the central compartment and each having one of its walls formed by one of the walls of the central compartment and having an outside wall arching the angular walls, means forming liquid-discharging channels extending out of the receiving-compartments; and a member constituting the axis of the rotor-device and, also, an inlet for introducing fluid into the central compartment.

3. A liquid metering structure including a measuring rotor rotating on a horizontal axis and comprising a centrally-disposed compartment having an odd number of angularly arranged walls parallel with the axis of rotation and side walls forming, with the angularly arranged walls, compartments and a corresponding number of outlets each communicating with a compartment; means leading into the compartment for conveying liquid thereto; a corresponding number of liquid-receiving compartments having separating side and end walls and arranged about the central compartment and into which each of the outlets therefrom extends; a discharge channel leading out of each receiving compartment; and means for receiving the contents of the compartments as the same are discharged from the rotor periodically.

4. A liquid-metering structure including a measuring rotor operating on a horizontal axis and comprising a centrally-disposed compartment having an odd number of angularly-arranged walls parallel with the axis of rotation and a corresponding number of outlets, said walls being arranged in angular relation to each other, and side walls associated therewith, forming separate compartments, having communication through the outlets; means leading into the compartment for conveying liquid thereto; and a corresponding number, comprising an odd number, of liquid-receiving compartments concentrically arranged about the central compartment and into which each of the outlets therefrom extends, each wall of the central compartment forming an angular wall of the receiving-compartment, said receiving-compartments also including two angularly disposed walls, and, also, an outside peripheral wall.

5. A liquid-metering structure including a casing; a measuring rotor rotatably disposed therein and comprising a central compartment having an odd number of angularly-disposed walls parallel to the axis of rotation and a corresponding number of outlet-ports, said walls being arranged in angular relation to each other, and side walls associated therewith, forming separate compartments, having communication through the outlets; an inlet-member extending from outside of the casing into the compartment; a corresponding number, essentially comprising an odd number, of liquid-receiving compartments concentrically arranged about the central compartment and with which each of the ports communicates; a discharge-channel leading out of each receiving-compartment and having a path of travel adjacent the lower portion of the casing and which channels discharge their contents into the casing periodically as the rotor rotates under the influence of the measured liquid.

6. A liquid-metering structure including a casing; a metering-device rotatably housed therein and comprising a drum consisting of a central, polyangular compartment having an odd number of sides and a series comprising a corresponding odd number of liquid-receiving compartments concentrically arranged about the central compartment and having independent communication therewith but closed against each other, the side walls and the angularly-disposed walls of those compartments forming separated receiving compartments and a central compartment; each receiving-compartment having an elongated discharge-channel peripherally disposed, and the central compartment having a series of ports, one at each of its angle portions and communicating with one of the compartments; and means extending into the central compartment from outside the casing for conveying liquid to the compartment.

7. A liquid-measuring structure including a casing; a metering-device rotatably housed therein and comprising a drum consisting of a central, triangular compartment and a series essentially comprising an odd number of liquid-receiving compartments concentrically arranged about the central compartment and having independent communication therewith but closed against each other, the side walls and the angularly-disposed walls of those compartments forming separated receiving compartments and a central compartment; each receiving-compartment having an elongated discharge-channel pehipherally disposed, and the central compartment having a series of ports, one at each of its angle portions and communicating with each of its compartments; means extending into the central compartment from outside the casing for conveying liquid to the compartment; and a chamber within the casing into which each receiving-compartment periodically discharges its contents as the device rotates under the influence of accumulating liquid which is conveyed into the central compartment and, then, discharged therefrom successively into the receiving compartments.

8. A liquid-measuring structure including a casing; a metering-device rotatably housed therein and comprising a hollow rotor drum divided into a plurality of liquid-receiving compartments concentrically arranged about the axis of rotation of the drum; a central compartment interconnecting with the receiving-compartments and including side walls associated with walls angularly-disposed with relation to each other, said walls also forming part of the boundaries of the receiving-compartments; the central compartment, adjacent each corner thereof, being provided with a liquid-discharging port which communicates with the adjacent receiving-compartment and having a liquid-guiding lip extending into the receiving-compartment to form a liquid-receiver when the lip-carrying wall occupies an approximately horizontal position; a liquid-discharging channel extending out of each of the receiving compartments; a chamber underlying the drum and adapted to receive the contents of each of the receiving-compartments as the same periodically discharges such contents after receiving the same from the central compartment; and means for introducing liquid to be measured into the central compartment.

9. A structure for metering water of condensation and other fluids, including a fluid-operated rotatable rotor comprising a central liquid-distributing compartment of polyangular form, and having a series of discharge-ports; a series of liquid-receiving compartments disposed concentrically about the central compartment and with which said ports communicate; said series essentially involving an odd number of compartments liquid-discharging channels extending out of each of the receiving-compartments; a liquid-inlet extending into the central compartment; and a casing in which the rotor is rotatably mounted comprising separable sections and means for securing said sections together.

10. A structure for metering water of condensation and other fluids, including a fluid-operated rotatable drum comprising a central liquid-distributing compartment of polyangular form, and having a series of discharge-ports; a series of liquid-receiving compartments disposed concentrically about the central compartment and with which said ports communicate; liquid-discharging channels extending out of each of the receiving-compartments; a liquid-inlet extending into the central compartment; and a casing in which the drum is rotatably mounted comprising separable sections; and means for locking said sections together including bosses formed on the outside of the casing-sections, and a holding member extending through the bosses and engaging therewith.

11. A structure for metering water of condensation and other fluids, including a fluid-operated rotatable drum comprising a central liquid-distributing compartment of triangular form, and having a series of discharge-ports; a series of liquid-receiving compartments disposed concentrically about the central compartment and with which said ports communicate; liquid-discharging channels extending out of each of the receiving-compartments; a liquid-inlet extending into the central compartment; a casing in which the drum is rotatably mounted comprising separable sections, each formed with a half-portion of a boss having a tapering wall; and means for locking the casing-sections together including a hollow bolt, the head of which engages tapering walls of the boss, whereby the casing-sections are securely clamped together.

12. A structure for metering liquids such as water of condensation, including a rotatable, fluid-operated drum comprising a central liquid-distributing compartment, a plurality of liquid-receiving compartments disposed concentrically about the central compartment and each provided with an opening to afford access to the interior of the drum, closure-devices associated with said openings; liquid-discharging channels extending out of the receiving compartments; and quantity-registering mechanism associated with the drum and operable thereby.

13. A liquid-metering structure including a rotatable measuring-drum comprising a centrally-disposed compartment having parallel side walls and walls angularly disposed with respect to each other as its perimeter and having a plurality of outlets; means for conveying liquid thereto; a series essentially involving an odd number of liquid-receiving compartments arranged about the central compartment, each wall of the central compartment forming an angular wall of the receiving-compartment, said receiving-compartments also including two angularly disposed walls, and, also, an outside peripheral wall.

14. A liquid-metering structure including a casing; a metering-device rotatably housed therein and comprising a drum characterized by a polyangular central compartment and a series essentially involving an odd number of liquid-receiving compartments arranged about the central compartment and having a discharge-channel, the central compartment having a series of ports, and a baffle-lip adjacent each port, one at each of its angular portions and communicating with each of the liquid-receiving compartments; and means extending into the central compartment from outside the casing for conveying liquid to the compartment.

15. A liquid-measuring structure including a rotatable metering-device comprising a rotor characterized by a polyangular central compartment and a series of liquid-receiving compartments arranged about the central compartment and having independent communication therewith but closed against each other, the liquid-receiving compartments being of odd number whereby overbalancing of the rotor in its cycle movement is insured.

16. A liquid-measuring structure including a rotatable metering-device comprising a hollow drum divided into a plurality of liquid-receiving compartments concentrically arranged about the axis of rotation of the drum; a central compartment interconnecting with the receiving-compartments and characterized by side walls associated with walls angularly disposed with relation to each other, said walls also forming boundaries of the receiving-compartments; the central compartment, adjacent each corner thereof, being provided with a liquid-discharging port which communicates with the adjacent receiving-compartment and having a liquid-guiding lip extending into the receiving-compartment and operating to periodically maintain a body of liquid on the wall on which the lip is formed; and a liquid-discharging channel extending out of each of the receiving-compartments.

17. A structure for metering water of condensation and other fluids, including a fluid-operated rotatable drum comprising a central liquid-distributing compartment of triangular form, and having a series of discharge-ports; and a liquid-holding baffle adjacent each port a series of liquid-receiving compartments disposed concentrically about the central compartment and with which said ports communicate; liquid-discharging channels extending out of each of the receiving-compartments, the liquid-inlet extending into the central compartment; and a casing in which the drum is rotatably mounted and characterized by separable sections, and means for locking said sections together.

18. A structure for metering liquids such as water of condensation, including a fluid-operated drum comprising a central liquid-distributing compartment, a plurality of liquid-receiving compartments disposed about the central compartment and each provided with an opening to afford access to the interior of the drum, and closure-devices associated with said openings.

19. A structure for metering liquids such as water of condensation, including a fluid-operated drum comprising a central liquid-distributing compartment, a plurality of liquid-receiving compartments disposed about the central compartment and each provided with an opening to afford access to the interior of the drum, and closure-devices associated with and frictionally held in place in said openings.

20. A structure for metering liquids such as water of condensation, including a fluid-operated drum comprising a central liquid-distributing compartment, a plurality of liquid-receiving compartments disposed about the central compartment and each provided with an opening to afford access to the interior of the drum, closure-devices associated with said openings, and a casing inclosing said drum and including separable sections to permit removal of one of them and thereby afford access to said closure-devices.

21. A liquid metering device comprising a measuring rotor including a central compartment having sides angularly arranged to each other to constitute, in cross-section, approximately an equilateral triangle; a liquid discharge-channel disposed in proximity to the apex of each angle of the central compartment; a measuring compartment communicating with each liquid discharge channel and arranged upon the rotor around the central compartment; and a liquid discharge leading from each measuring compartment.

22. A device for measuring liquids comprising a rotor; a normally closed measuring chamber provided with a liquid inlet and liquid outlet associated with the rotor; means for permitting access to the interior of the measuring chamber for the purpose of cleaning the interior thereof; said means comprising a cleaning opening provided in a portion of the chamber; and means normally closing the opening but removable for cleaning.

In testimony whereof I affix my signature in presence of two witnesses.

EUGENE L. BARNES.

Witnesses:
HOWARD LONG,
H. C. KIMBROUGH.